No. 763,169. PATENTED JUNE 21, 1904.
T. M. EYNON.
CONDENSER.
APPLICATION FILED APR. 2, 1902.
NO MODEL.
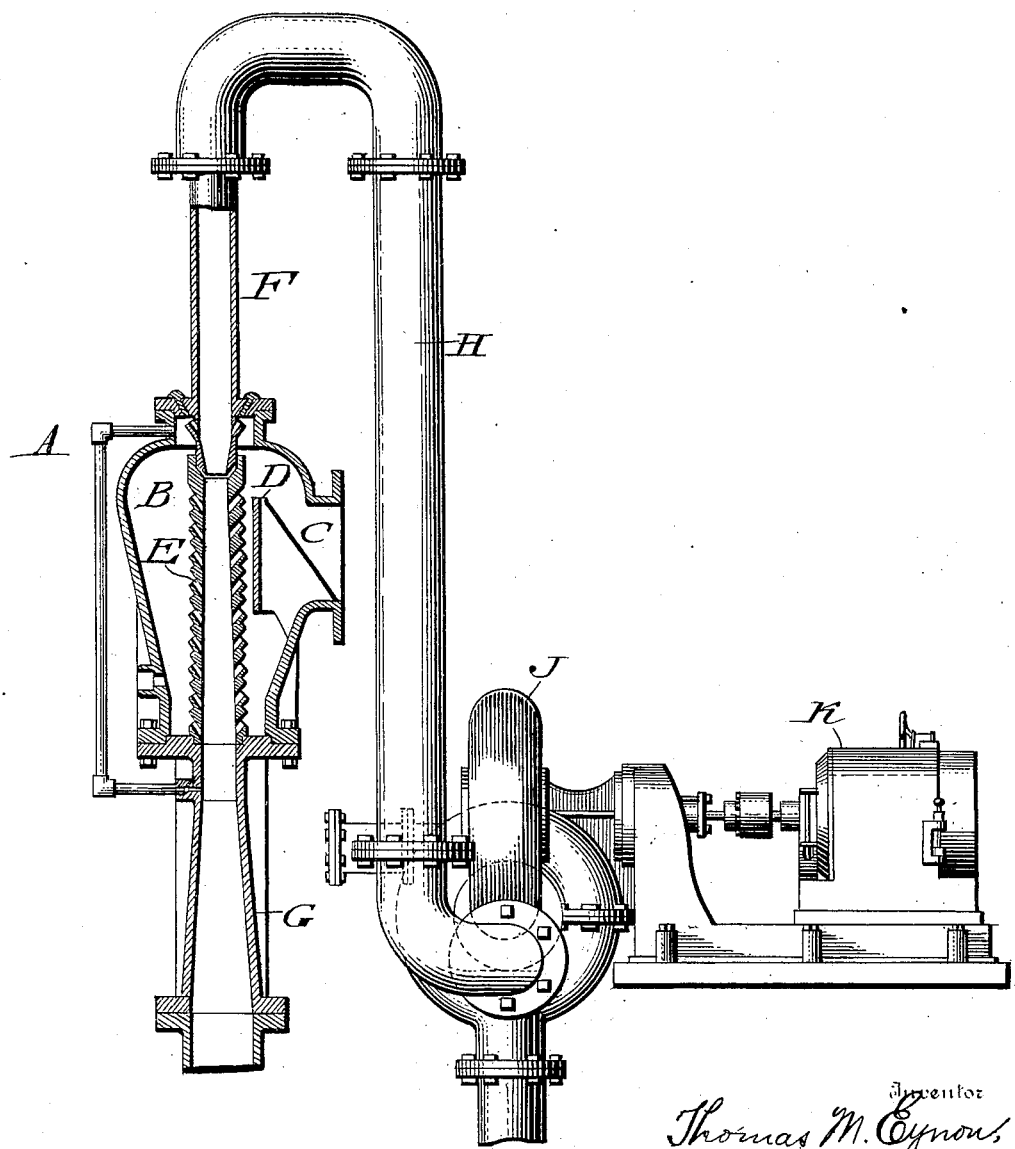

No. 763,169. Patented June 21, 1904.

UNITED STATES PATENT OFFICE.

THOMAS M. EYNON, OF PHILADELPHIA, PENNSYLVANIA, ASSIGNOR TO EYNON-EVANS MANUFACTURING COMPANY, A CORPORATION OF PENNSYLVANIA.

CONDENSER.

SPECIFICATION forming part of Letters Patent No. 763,169, dated June 21, 1904.

Application filed April 2, 1902. Serial No. 101,121. (No model.)

*To all whom it may concern:*

Be it known that I, THOMAS M. EYNON, a citizen of the United States, residing in the city and county of Philadelphia, State of Pennsylvania, have invented a new and useful Improvement in a Combined Condenser and Electrically-Driven Pump, of which the following is a specification.

To secure the highest efficiency in a condenser system in maintaining an even and regular vacuum, it is necessary to supply the condensing-water thereto in a constant quantity relative to the quantity of exhaust-steam, or, in other words, to always supply to the condenser sufficient water to condense the exhausting steam and no more, it being obvious that more than a sufficient quantity of condensing-water to condense the steam is superfluous and requires unnecessary expenditure of energy in lifting it to the condenser. In some cases—for instance, in a city water-pumping station, where the work done by the engine is practically even and regular—the quantity of exhaust-steam and the quantity of condensing-water supplied are also practically even and regular; but in other cases the load on the engine and likewise the quantity of exhausting steam varies, so that it is necessary to secure the highest efficiency in maintaining an even and regular vacuum to vary the quantity of condensing-water supplied to the condenser, so that it is constant relative to the quantity of exhaust-steam.

In a condenser system to which my invention relates independent means are employed to supply the condensing-water to the condenser—namely, the condenser itself by the action of the exhaust-steam and power-driven means—such as, for instance, a centrifugal pump—these condensing-water-supplying means being capable of and acting independently and dependently, and when acting dependently they automatically adjust themselves to requirements to supply to the condenser a quantity of water to maintain an even and regular vacuum, the power-driven water-supplying means being dependent upon and being controlled automatically by the action of the exhaust-steam or to the extent that the exhaust-steam assists in lifting the water, or, in other words, when the independent water-supply means are working dependently the quantity of water lifted by the assistance of the exhaust-steam automatically controls the quantity lifted by the power-driven means, so that the power required to drive the latter to maintain an even and regular vacuum is kept at the minimum. As the quantity of exhaust-steam varies when the load on the engine is irregular, its assistance in lifting the water varies, and the automatic control of the power-driven water-supplying means is such that when the assistance from the exhaust-steam decreases the quantity of water lifted by the power-driven means increases, and vice versa, so that under all conditions a sufficient quantity of water to condense the exhaust-steam is supplied, such quantity being constant relative to the quantity of exhaust-steam to maintain an even and regular vacuum.

In the accompanying drawing, illustrating one form of apparatus embodying my invention, I have shown a partial elevation of a partial vertical section of a jet-condenser and an electrically-driven centrifugal pump for supplying the condensing-water thereto.

Referring to the drawing, A designates a jet-condenser consisting of the usual steam-chamber B and having the inlet C for the exhaust-steam, between which inlet and the combining-tube E is situated the baffle-plate D. The nozzle F supplies condensing-water to the upper end of the tube E and communicates with the water-supply pipe H, leading from the centrifugal or other pump J, said pump being driven by an electric motor K.

G is the discharge-tube of the condenser.

The electric motor K *per se* forms no part of this invention, as any suitable or conventional form of motor may be employed, and I therefore do not deem it necessary to describe the same in detail.

In accordance with the principle of my invention I therefore provide independent means for supplying the water to the condenser to which I have heretofore referred, the action of the exhaust-steam in the condenser being one of these means, while in the embodiment shown the electrically-driven centrifugal pump is the other means, the action of the latter or the quantity of water which it lifts being dependent upon and controlled by the quantity of water lifted by the exhaust-steam, since these devices operate dependently. To illustrate the operation of this condensing system, we will suppose, for instance, that it is applied to an engine that is doing regular and even work, as in a city water-pumping station. In such a case before the engine is started, there being no exhaust-steam, the centrifugal pump will be started to pump, for instance, about fifty per cent. of the normal supply of condensing-water. Then when the engine starts the action of the exhaust-steam assists in lifting a portion of the water necessary to condense, and as the assistance from the exhaust-steam increases the power required to drive the centrifugal pump correspondingly decreases, and when the engine is working normally and even and regular with an even and regular exhaust the work done by the pump likewise is even; but the power necessary to drive the pump will have decreased, so that, for instance, if the assistance from the exhaust-steam is doing from seventy to ninety per cent. of the work in lifting the water the pump will only be doing from thirty to ten per cent. In this way I provide means for regulating and controlling the pump to maintain the flow of a constant quantity of water, for the amount of exhaust-steam being even and regular the amount of condensing-water would likewise be even and regular and constant relative thereto to maintain an even and regular vacuum; but in other cases it is obvious that the quantity of exhaust-steam varies with the load upon the engine, varying likewise the assistance in lifting the water afforded by the exhaust-steam, and the object of my invention in such a case is to supply sufficient condensing-water to maintain an even and regular vacuum, although its quantity varies relative to the quantity of exhaust-steam. In such cases when the assistance from the exhaust-steam decreases it is necessary to correspondingly increase the assistance of the pump or power-driven means, and this is done automatically, for as soon as the quantity of water lifted by the assistance of the exhaust-steam decreases the work done by the electrically-driven pump increases correspondingly to supply sufficient water to condense the steam and the contrary is true, for when the assistance from the exhaust-steam increases the water lifted from the electrically-driven pump correspondingly decreases.

In the structure of the prior art with which I am familiar the exhaust-steam comes in contact with the condensing-water only to be condensed; but in my present invention I not only condense the water, but by the construction of my combining-tube E, I impart the velocity of the steam entering at C to the jet of water passing through the condenser, and thus increase the speed of the column of water passing therethrough and assisting in lifting the water and requiring less force from the pump, which, as above set forth, automatically adjusts its power and the quantity of water that it lifts corresponding to the assistance from the exhaust-steam.

From the foregoing it is seen that I provide means for regulating and controlling the action of my means for supplying condensing-water that is independent of the action of the exhaust-steam by the assistance of the latter in lifting the water and that thereby I automatically supply a quantity of water under varying assistance of the exhaust-steam that is constant relative to the quantity of the latter to maintain thereby an even and regular vacuum.

It will be evident that many changes may be made by those skilled in the art which will come within the scope of my invention, and therefore except in the claims for the specific structure herein shown and described I do not desire to be limited to such construction, because my invention comprises, broadly, the employment of independent means for supplying the condensing-water to a condenser that are automatically controlled by the action of the exhaust-steam.

Having thus described my invention, what I claim as new, and desire to secure by Letters Patent, is—

1. In a condenser system, independent means for supplying the condensing-water thereto, said independent means being automatically controlled by the action of the exhaust-steam.

2. In a condenser system, means independent of the exhaust-steam for supplying condensing-water thereto controlled by said exhaust-steam.

3. In a condenser system, a plurality of dependent means for supplying water thereto.

4. In a condenser system, a plurality of automatically-dependent means for supplying water thereto.

5. A condenser having means for supplying water thereto controlled by the exhaust-steam, whereby a constant quantity of water is maintained relative to the quantity of exhaust-steam.

6. In a condenser system, independent means for supplying the condensing-water thereto, said independent means being automatically controlled by the action of the exhaust-steam and means imparting increased velocity to the condensing-water by the action of the exhaust-steam.

7. In a condenser system, power-driven means for supplying water thereto controlled by the exhaust-steam.

8. In a condenser system, power-driven means for supplying water thereto controlled by the current of water lifted by the exhaust-steam.

9. In a condenser system, a centrifugal pump for supplying water thereto controlled by the exhaust-steam.

10. In a condenser system, a centrifugal pump and an electric motor for driving the same controlled by the exhaust-steam.

11. The combination with a condenser, of means, independent of the exhaust-steam, for supplying condensing-water thereto, said means being controlled by the exhaust-steam in supplying water to said condenser.

12. The combination with a condenser in which the exhaust-steam assists in supplying the condensing-water thereto, of independent means for supplying said condensing-water thereto controlled by the quantity of water supplied by the exhaust-steam.

13. A condenser having means independent thereof for supplying water thereto controlled by the action of the condenser.

14. In a condenser system, means for supplying water thereto automatically controlled corresponding to the quantity of exhaust-steam.

15. The combination of a jet-condenser, a suitable pump having a discharge-pipe leading to said condenser and an electric motor for said pump.

16. The combination of a jet-condenser, a suitable pump having a discharge-pipe leading to said condenser and an electric motor for automatically adjusting the flow of the water, depending upon the power imparted to it by the exhaust-steam.

17. The combination of a jet-condenser, a centrifugal pump having a discharge-pipe leading to said condenser, and an electric motor for said pump.

18. The combination with a condenser, of a centrifugal pump for supplying the injection-water thereto, and means for regulating said pump to maintain the flow of a constant quantity of water relative to the quantity of exhaust-steam.

19. The combination with a condenser in which the vacuum assists in lifting the water, of a centrifugal pump, and means for regulating said pump to maintain a flow of a constant quantity of water relative to the quantity of exhaust-steam under varying assistance of the vacuum.

THOMAS M. EYNON.

Witnesses:
JOHN A. WIEDERSHEIM,
WM. CANER WIEDERSHEIM.